Patented Feb. 2, 1937

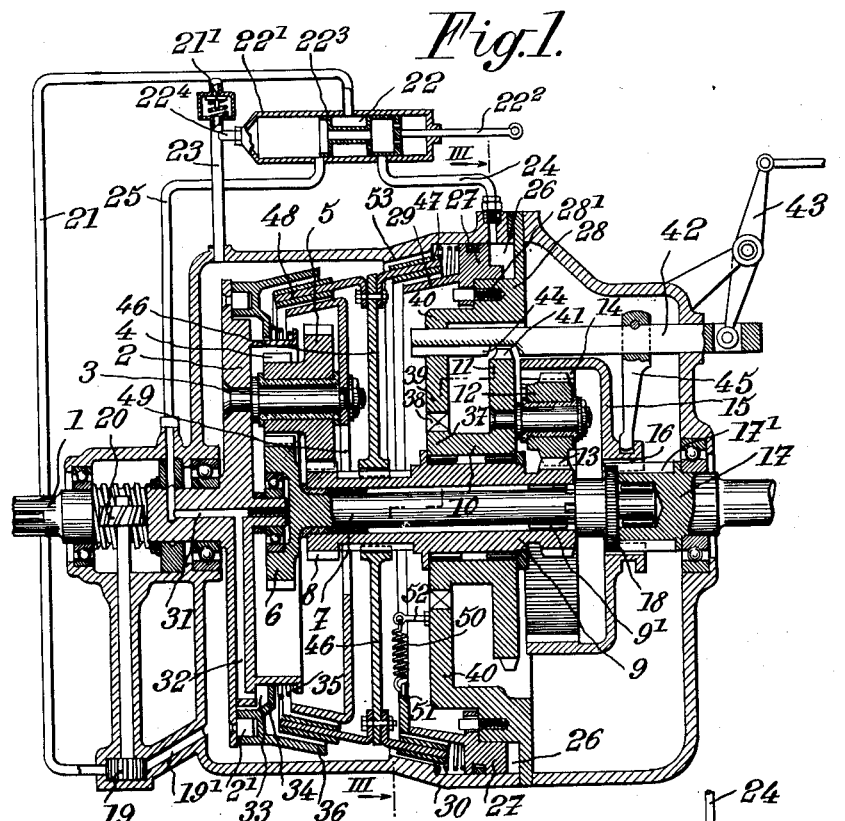

2,069,408

UNITED STATES PATENT OFFICE 2,069,408

TRANSMISSION

Alphonse Forichon, Paris, France

Application December 5, 1935, Serial No. 53,069
In Belgium July 31, 1935

19 Claims. (Cl. 74—276)

The present invention relates to variable speed transmissions including epicyclic trains and it is more especially, although not exclusively, concerned with devices of this kind employed in connection with automobile vehicles.

The object of the present invention is to provide a transmission of this kind such that reverse gear and transmission in the frontward direction with a predetermined number of different gear ratios can be obtained through a smaller number of gear wheels, whereby the transmission is simpler, cheaper and occupies a smaller volume.

The essential feature of the present invention consists, in a transmission of the kind above referred to, in causing the reverse gear epicyclic train to cooperate with the epicyclic train of at least one gear combination intermediate between the lowest gear and the top gear, by temporarily interconnecting the fixed member of said intermediate gear combination with the driving member of said reverse gear epicyclic train so as to increase the reduction and the torque necessary for driving the driven shaft with a lower gear ratio.

Other features of the present invention will result from the following detailed description of a specific embodiment thereof.

A preferred embodiment of the present invention will be hereinafter described with reference to the accompanying drawing, given merely by way of example and in which:

Fig. 1 is an axial sectional view of a variable speed transmission made according to the present invention;

Fig. 2 is a partial view, analogous to Fig. 1 showing some of the parts in different relative positions;

Fig. 3 is a cross sectional view on the line III—III of Fig. 1.

In variable speed transmissions of the sun and planet wheel type, that is to say of the type including sun wheels or internal sun gears cooperating with simple or multiple planet wheels, there are generally provided, in order to obtain the drive of the vehicle in the frontward direction, a plurality of gear combinations of this kind which are caused to work either separately or in series for transmitting the movement with the desired gear ratios. For instance, direct drive is generally obtained by connecting the driven shaft, through a clutch device, with a suitable element of the transmission in such manner that the whole of the epicyclic group to which said element belongs is driven, without exerting any reducing action, by the driving shaft. With these known devices, the drive in reverse gear is obtained through a special epicyclic train.

In the case of a variable speed transmission of the usual type, having for instance three distinct gear combinations, there are provided, in addition to the direct drive transmission means, three distinct epicyclic trains to wit: a speed reducing train for second gear, a speed reducing train for first gear, and a reversing train for reverse gear.

It is known that, in order to obtain the working in second gear, there is transmitted to the epicyclic train, through its element which is directly connected with the driving shaft, a driving torque which is transformed into a higher torque on the driven shaft, owing to the reaction on a stationary organ (sun organ or planet-wheel carrying organ).

In order to obtain the drive in first gear, it is necessary to obtain, on the driven shaft, a speed reduction about twice greater and a driving torque about twice higher. In ordinary gear boxes, this increase of the speed reduction and of the torque transmitted are obtained by bringing into play an epicyclic train especially devised for this purpose.

According to the present invention, I release the stationary organ (sun organ or planet-wheel carrier) of the epicyclic train corresponding to second gear and I cause said organ to act on the driving organ of the epicyclic train corresponding to reverse gear, this last mentioned group being itself rendered rigid with the driven shaft.

With this arrangement, the drive of the driven shaft is effected at a lower speed of revolution, owing to the intervention of the reverse gear epicyclic train, which increases the speed reduction. Furthermore, to the torque transmitted directly by the epicyclic group corresponding to second gear, which torque remains the same as when said group is working separately, there is added the reaction torque of the organ that was stationary when running in second gear, this last mentioned torque being amplified and rectified by the reverse gear epicyclic group before being transmitted to the driven shaft.

All the conditions are therefore fulfilled for driving the driven shaft with a greater speed reduction and a higher torque which characterize the drive in first gear corresponding to frontward displacement of the vehicle.

For the drive in reverse gear, the epicyclic group provided for this purpose works alone, being driven through the second gear epicyclic group which, in this case, turns as a whole as in direct drive, thus transmitting directly to the reversing gear wheels provided for reverse gear the power of the engine, these gear wheels ensuring by themselves the necessary speed reduction, the reversing of the drive, and the increase of the driving torque.

With this arrangement, I obtain a transmission which permits of driving the driven shaft with three different gear ratios when running in the frontward direction and with a gear ratio for reverse gear, while employing only the number of gear wheels that corresponds to a gear box of the usual type having only two different gear combinations in frontward drive. Furthermore, the teeth of these gear wheels work at a lower rate than the teeth of a gear train which would give the torque multiplication corresponding to first gear (about one half).

It is possible to apply, in a more general way, the principle of the arrangement above described to gear boxes having a number of distinct gear combinations in frontward drive higher than three. It suffices, for this purpose, to cause the reverse gear epicyclic train to cooperate with the epicyclic train of at least one gear combination intermediate between lowest gear and top gear, by temporarily interconnecting the fixed organ of this intermediate gear combination with the driving organ of said reverse gear epicyclic train, so as to obtain the increase of the speed reduction and of the torque necessary for the drive of the driven shaft with a lower gear ratio.

In the accompanying drawing, I have illustrated, by way of example, the case of a gear box having three distinct gear combinations in frontward drive and one combination in reverse drive. Furthermore, it has been assumed that the control of the box mechanism (whether it is operated through an auxiliary energy, such as fluid under pressure, electricity, etc. or directly, and whether it is manual or automatic or semi-automatic) is effected through frictional clutches. Of course, these clutch mechanisms may be replaced, if necessary, by any other kinds of clutches, such for instance as electromagnetic clutches.

In the mechanism illustrated by this drawing, on the driving shaft 1, there is mounted a disc 2 carrying the axes of planet wheels 4 and 5, rigid with one another, said axes being designated by reference character 3. Planet wheels 4 mesh with a central sun pinion 6 fixed on an intermediate shaft 7. Planet wheels 5 mesh with a sun wheel 8 rigid with a sleeve 9 free to move with respect to the intermediate shaft 7, needle bearings, ball bearings or the like $9^1$ being interposed between intermediate shaft 7 and sleeve 9.

On this sleeve 9, there is freely mounted a sleeve 10, with rollers or needles interposed between them. Said sleeve 10 carries a disc 11 in which are mounted the spindles of planet wheels 12. These planet wheels 12 mesh, on the one hand, with a central toothed wheel or sun wheel 13, rigid with sleeve 9 and therefore with sun wheel 8, and, on the other hand, with a cylindrical element 14 provided with internal teeth and carried by a plate 15 the hub of which is provided with internal ribs 16 engaging with corresponding external ribs $17^1$ carried by the driven shaft 17. With this arrangement, said plate 15 can be moved parallelly to the driven shaft while remaining always angularly connected with said shaft.

In Fig. 1, I have shown plate 15 in its extreme position toward the left hand side of the drawing. In this position, the internal ribs of the hub 16 of said plate are also engaged between the peripheral teeth of a disc 18 keyed on the intermediate shaft 7, whereby shafts 7 and 17 are coupled together. In Fig. 2, plate 15 is shown in its extreme position toward the right hand side of the drawing, in which position, the internal ribs of hub 16 are no longer engaged with the teeth of disc 18, so that shafts 7 and 17 are no longer coupled with each other.

In the example illustrated by the drawing, the gear box is controlled through friction clutches which are operated by means of a hydraulic control system.

The liquid under pressure used in this hydraulic system is, for instance, the lubricating oil of the engine or the lubricating oil of the casing of the gear box. In this latter case, said oil is collected at $19^1$ at the bottom of the casing and it is discharged, through a pump 19, either of the volumetric or of any other type, driven, through a tangential screw 20, by the driving shaft 1 as soon as the engine is started, into pipe 21.

This oil is led, through pipe 21, to a distributing device 22 which may occupy three characteristic positions under the action of a control $22^2$, operated by the pilot or through automatic means (not shown in the drawing). This distributing device includes, for instance, a cylinder $22^1$ and a slide valve $22^3$ consisting of two hollow pistons connected together by an axial passage. Tube 21 further communicates, through a valve $21^1$, the spring of which is of suitable strength, with a tube 23 opening into the casing. One of the ends of cylinder $22^1$ is connected, through a passage $22^4$, with tube 23, beyond valve $21^1$. With this arrangement, there exists at any time inside the distributing device (with the exception of the space between the two pistons thereof) the same pressure as in the casing, which is an essential condition for permitting the axial displacement of the slide-valve. Furthermore, this arrangement permits of collecting the oil returns and the amount of oil that may have leaked out between the cylinder and the pistons of the slide-valve.

When slide-valve $22^3$ is in its intermediate position, as shown by Fig. 1, the oil that is discharged through pipe 21 can flow out only through valve $21^1$ and it is thus returned to the casing through tube 23, being subsequently driven again into tube 21 by pump 19. Therefore, the oil flows through a closed circuit without its pressure being used for any purpose whatever.

When slide valve $22^3$ is moved toward the right hand side of Fig. 1, tube 21 is brought into communication with a tube 24 which opens into an annular hollow 26 provided in a transverse stationary piece 28 rigid with the casing. This recess 26 is closed by an annular piston 27 capable of sliding axially in said recess against the action of a return spring 30. This annular piston 27 is guided in its housing 26 by means of studs or pins $28^1$ carried by the stationary part 28 and extending through holes $28^0$ (Fig. 3) provided in said annular piston 27. This piston 27 carries a conical part 29 the function of which will be hereinafter described. When the distributing device is brought into the operative position thereof for which the pressure acts through conduit 24, this pressure is transmitted to the space inside recess 26 and annular piston 27 is moved toward the left hand side of Fig. 1, compressing spring 30. This spring shall return said piston into its initial position as soon as the pressure ceases to act in said recess 26.

When slide-valve 22³ is moved toward the left hand side of Fig. 1, the oil pressure acts in tube 25, which opens, through a rotary joint, into a conduit 31 provided axially in the driving shaft 1 and which is prolonged by at least one conduit 32 provided in disc 2. This conduit opens into an annular recess 33 the lateral wall of which 34 can slide, along guides 2¹ carried by disc 2, against the action of a return spring 35. It follows that the sliding partition 34 is always driven in rotation by plate 2 at a speed equal to that of the driving shaft 1. This sliding partition 34 also carries a conical part 36 the function of which will be hereinafter explained. When the slide-valve 22³ of the distributing device is brought into its active position toward the left hand side of Fig. 1, the oil pressure is transmitted, through conduits 23, 31 and 32, into the annular recess 33 and it pushes the sliding partition 34 toward the right hand side of Fig. 1, compressing spring 35. This partition 34 is brought back into its initial position as soon as the action of the oil pressure ceases.

Sleeve 10, which carries the planet wheels 12, also carries the central element 37 of a free wheel mechanism 38 (Fig. 3) the outer element 39 of which is carried by a prolonged part 40 of the stationary transverse wall 28 above referred to. This free wheel mechanism permits sleeve 10 to turn in the same direction as the driving shaft 1 but it opposes the rotation of said sleeve 10 in the opposite direction because, in this case, the stationary part 40 prevents any angular displacement.

Sleeve 10 further carries a series of teeth 41 adapted to cooperate with a bolt 42 carried by the casing and capable of being moved axially through an external device 43 operated either by the pilot or by an automatic device. This bolt carries a notch 44 located in a position such that, when the bolt occupies one of its active positions, as shown in Fig. 1, said notch is in register with said teeth 41, whereby sleeve 10 can rotate. In its other active position (Fig. 2), this bolt 42 is engaged between said teeth 41, thus angularly locking sleeve 10.

It follows that, when bolt 42 releases sleeve 10, the latter can turn in the same direction as the driving shaft 1 but it cannot rotate in the opposite direction. On the contrary, when bolt 42 is engaged between teeth 41, sleeve 10 cannot rotate in any direction whatever. It is to be remembered that the movement of sleeve 10 determines that of the planet wheels 12 and therefore the rotary movement of gear 14, which is integral with plate 15.

Bolt 42 further carries a fork 45 which acts on the hub of plate 15 in such manner that the latter is driven simultaneously with bolt 42 and in the same direction, under the action of the external control member 43.

On sleeve 9 is slidably keyed a plate 46, provided between conical parts 29 and 36, carried by movable elements 27 and 34, as above explained. On either side of said plate 46, and rigid therewith, are provided conical elements 47 and 48.

Conical element 47 carries on its inner face a friction lining intended to cooperate with the conical part 29 carried by annular piston 27 and, on its outer face, it carries another friction lining intended to cooperate with a conical seat 53 rigid with the stationary casing.

Conical part 48 carries on its outer face a friction lining intended to cooperate with the conical part 36 carried by sliding part 34, and, on its inner face, another conical lining intended to cooperate with the conical edge of a plate 49 mounted on the ends of the spindles of planet wheels 4, 5 and therefore driven in rotation by disc 2 at the speed of driving shaft 1.

It should be noted that the conical friction elements of the clutches above described might also be replaced by plane elements, either simple or multiple, or again by electro-magnetic clutches in the case in which the power necessary for operating the gear box, instead of being supplied by a fluid under pressure (or at a pressure lower than atmospheric pressure) would be supplied by a source of electric current.

The variable speed transmission above described works in the following manner:

For all combinations corresponding to the vehicle running in the forward direction, bolt 42 and fork 45 are in the position shown by Fig. 1 in which they allow sleeve 10 to turn (only in the direction in which shaft 1 is running). In this position of the parts, plate 15 couples, through ribs 16, the intermediate shaft 7 with the driven shaft 17.

The engine being started and distributing device 22 being in its intermediate position, as shown by Fig. 1, in which oil flows in a closed circuit without producing any effect, I obtain the first gear without effecting any special operation for this purpose.

In this position of the distributing device 22, clutch elements 47 and 48 are out of contact with the organs with which they can cooperate.

The main shaft 1 being operatively connected with the engine, the planet wheels 4 and 5 are driven by disc 2 in the same direction about sun wheels 6 and 8, respectively. As sun-wheel 8 is coupled with the driven shaft 17 through sleeve 9, epicyclic train 13, 12, 14, and plate 15, it is subjected, from this driven shaft, to a reaction which tends to turn it in a direction opposed to that of the engine, the same reaction tending to drive planet-wheel 4 and sun-wheel 6 in the same direction as shaft 1.

Rotation in a direction opposed to that of shaft 1 is prevented, for sleeve 10 and the elements that move together with it, by free-wheel mechanism 38, whereby the spindles of planet-wheels 12 are stationary. Movement and motive power are therefore transmitted to the driven shaft 17 partly through the direct meshing of planet wheels 4 with the sun-wheel 6 of the intermediate shaft, and partly through the action in the opposite direction of planet-wheels 5 on sun wheel 8, rectified by epicyclic train 13—12—14.

When it is desired to change into second gear, the slide-valve 22³ of the distributing device 22 is moved toward the right hand side of Fig. 1, whereby the oil pressure acts, through tube 24, into recess 26, thus pushing annular piston 27 toward the left hand side of the drawing. This moves conical part 29 toward clutch element 47 and applies said element against the conical seat 53 carried by the casing. It follows that plate 46 is locked angularly, and, together with it, sleeve 9, together with the pinion 8 carried by said sleeve.

The planet-wheels 4 and 5 are thus caused to turn about the stationary sun-wheel 8 and it follows that sun-wheel 6 and intermediate shaft 7 drive the driven shaft 17 at a speed higher than the preceding one, which will be the speed corresponding to second gear.

The internal gear 14 participates in this movement and drives planet-wheels 12, but the latter do not offer any resistance since their axes are urged in the direction of rotation of shaft 1 and sleeve 10, which carries said axes, is free to rotate in this direction, due to the provision of the free-wheel mechanism 38.

In order to obtain the drive in third gear or in direct drive, the slide valve 22³ of the distributing device is brought into its active position toward the left hand side of Fig. 1. In this position, the oil pressure is cut off in conduit 24 and it is transmitted, through conduit 25, to the sliding partition 34. Conical part 36 then comes into contact with the clutch element 48 and it pushes it toward the right hand side of Fig. 1, so as to bring it into contact with the conical part of plate 49, rigidly connected to driving shaft 1 through disc 2. It follows that sun-wheels 6 and 8 are both driven at the same speed and in the same direction as shaft 1. The epicyclic train 13—12—14 participates in this movement and it turns as a whole, together with shafts 7 and 9, owing to the provision of the free-wheel mechanism between sleeve 10 and stationary part 39.

In order to change into reverse gear, I act on control 43 in such manner as to bring bolt 42 into the position shown in Fig. 2 in which the teeth 41 of sleeve 10 are in engagement with said bolt, so that said sleeve is locked. When the parts are in this relative position, the internal gear 14 remains in mesh with planet-wheels 12 but sleeve 15 moves away from disc 18, which is rigid with shaft 17. The slide valve 22³ of the distributing device occupies the position corresponding to direct drive, for which the oil pressure pushes the sliding partition 34. It follows, as above explained, that the epicyclic train turns as a whole together with the driving shaft 1 and drives the sun-wheel 13 through hollow shaft 9. On the contrary, shaft 7 and its disc 18 remain inactive. Planet wheels 12, the spindles of which are fixed in position by plate 11 and bolt 42, cause gear 14 to turn, and together with it, plate 15 and shaft 17, in a direction opposite to the direction of rotation of shaft 1, and with a certain speed reduction.

In an arrangement as above described, the changing from one gear combination to another one can be made without disconnecting the engine or without causing it to slow down. The engagement of the clutch means, which is controlled through hydraulic means operated by oil, and which works in oil, can be made gradual enough for this purpose.

When passing from one gear combination to another one, when changing into higher gears, the operation can be carried out rapidly so as to engage a driving shaft turning at a higher speed with a transmission mechanism turning at a lower speed, and a gradual action clutch system produces a supplementary temporary acceleration which is not disagreeable.

On the contrary, when, due to a slowing down of the engine resulting from an increase of the resistance of the driven shaft, it is necessary to change into a lower gear, so as to obtain a greater driving torque, the engine turns, for a certain time at a lower speed than the transmission and therefore opposes, by its inertia, a resistance which lasts for a very short time.

With the arrangement above described, this drawback can occur only when changing from second gear into first gear, owing to the presence of the free-wheel mechanism 38, which releases the planet-wheel carrier 11 as long as the speed of revolution of the engine is lower than that corresponding to the gear ratio of first gear.

On the contrary, in order to change from third gear into second gear, it is advisable either to interpose a second free-wheel between plate 46 (which carries clutch element 47) and sun-wheel 8, which would give a similar result.

It is also possible, as shown by the drawing, to give orifices 28⁰ of stationary plate 28, in which orifices the studs of annular piston 27 are guided, an elongated shape. With this arrangement, piston 27 is allowed to move angularly through a small angle, in the direction of the arrow with respect to the stationary plate 28 and therefore with respect to the outlet of conduit 24. However, this displacement is sufficient for causing the edge of piston 27 to more or less cover the outlet of conduit 24, which temporarily stops the action of the oil pressure, independently of the position given, at this time, to the slide valve of the distributing device 22.

Springs 50 connected, on the one hand, at 51, to annular piston 27 and, on the other hand, at 52, to wall 40 tend to urge said piston 27 in a direction opposed to that of the driving torque so as to bring it into its initial position, for which the outlet opening of tube 24 is located opposite the inlet of annular recess 26. When changing from direct drive to second gear, the oil pressure is caused to act through tube 24, as above described, which applies the clutch cone against its conical seat 53 provided on the casing. If the speed of revolution of the driving shaft 1 is lower than that of the driven shaft 17, the reaction torque on the planet wheel acts in the same direction as the driving torque and annular piston 27 is driven in this direction through the contact of conical part 29 with the conical portion 47 of plate 46. The angular displacement of piston 27 more or less closes the outlet of conduit 24 until the speed of revolution of the driving shaft tends to exceed that of the driven shaft 17. The reaction torque on the sun-wheel is then automatically reversed, which permits annular piston 27 to come back into its initial position, for which second gear can be normally obtained.

As already stated, the principle of the invention can be applied to a gear box having more than three distinct gear combinations in forward drive. For this purpose I might, for instance, provide on the input side of such a box a speed multiplying device controlled in the same manner so as to obtain six different speeds one of which is surmultiplied and two others are intermediate. I might also provide, on the output side of the box a speed reducing device giving two supplementary intermediate speeds and one supplementary reduced speed. The ratio of the first and last gear ratios might then be 7 to 1.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a transmission, a driving shaft, a driven shaft, an epicyclic gear train connected to the driving shaft to provide a plurality of forward transmission ratios, an epicyclic forward and reverse gear train connected to the driven shaft, means operatively interconnecting the gear trains, means cooperating with said first mentioned gear train and including a control element on said interconnecting means to obtain forward speed ratios above the lowest, and means cooperating with said forward and reverse gear train to provide the lowest speed ratio when said control element is rendered ineffective.

2. Variable speed transmission, comprising a driving shaft, a driven shaft, a first epicyclic gear train connected to the driving shaft to provide a plurality of forward transmission ratios, a second forward and reverse epicyclic gear train including a driving member and a driven member connected to the driven shaft, means operatively interconnecting said gear train including means rigid with said driving member, means cooperating with said first gear train and including a control element on said means rigid with the driving member to obtain forward speed ratios above the lowest, and means cooperating with the second train to provide the lowest ratio when said control element is rendered ineffective.

3. In a device as claimed in claim 1, said last means comprising means to prevent reverse rotation of one element of the second train.

4. In a device as claimed in claim 1, said interconnecting means comprising a sleeve, said control element being keyed on the sleeve.

5. In a device as claimed in claim 1, an intermediate shaft between said driving and driven shafts, an element of said first gear train being secured on said intermediate shaft.

6. In a device as claimed in claim 1, an intermediate shaft between said driving and driven shafts, an element of said first gear train being secured on said intermediate shaft, said interconnecting means including a sleeve around said intermediate shaft.

7. In a device as claimed in claim 1, an intermediate shaft between said driving and driven shafts, an element of said first gear train being secured on said intermediate shaft, and releasable means for rigidly connecting said intermediate shaft and said driven shaft.

8. Variable speed transmission comprising a driving shaft, a driven shaft, an epicyclic gear train, said gear train having a planet gear element and a carrier on which said planet gear element is mounted, said carrier being connected to the driving shaft, an intermediate shaft, the sun gear of said gear train being mounted on said intermediate shaft and meshing with said planet gear element, means connecting the intermediate shaft and the driven shaft, a sleeve concentric with the intermediate shaft, said gear train including a gear fixed on said sleeve and meshing with said planet gear element, a forward and reverse epicyclic gear train including a driving member secured on said sleeve, and a driven member operatively connected to the driven shaft, said second gear train including an intermediate member, means to immobilize said sleeve to obtain one gear combination, and means to prevent reverse rotation of the intermediate member of the second gear train to obtain another gear combination when said immobilizing means is ineffective.

9. A device as claimed in claim 8, in which the means connecting the intermediate shaft and the driven shaft may be disconnected to permit a reverse drive.

10. A device as claimed in claim 8, in which said means to prevent rotation of the intermediate member of the second gear train comprises a one-way clutch device.

11. A device as claimed in claim 8, in which the intermediate member of the second gear train is mounted to turn on said sleeve.

12. Variable speed transmission comprising a driving shaft, a planet gear carrier rigidly mounted on said driving shaft, a planet gear element mounted on said carrier, a driven shaft, an intermediate shaft between said driving and driven shafts, a gear on said intermediate shaft, said planet gear element including a gear engaging the gear on the intermediate shaft, a sleeve mounted on said intermediate shaft concentric therewith, gears on opposite ends of said sleeve, a second gear on said planet gear element meshing with one of the gears on said sleeve, a rotatable carrier, a gear mounted on said carrier and meshing with the other gear on said sleeve, means for preventing reverse rotation of said second carrier, an internally geared member meshing with the gear on said second carrier, means keying said last member to the driven shaft for sliding movement with respect thereto, means on the intermediate shaft engageable by said last member for locking together the intermediate and driven shafts, means for shifting said last member, said second carrier having teeth on its periphery, means movable to engage said teeth and immobilize said carrier for reverse drive, and means operable to lock said sleeve to said first carrier or to immobilize the same.

13. Variable speed transmission comprising a driving shaft, a planet gear carrier rigidly mounted on said driving shaft, a planet gear element mounted on said carrier, a driven shaft, an intermediate shaft between said driving and driven shafts, a gear on said intermediate shaft, said planet gear element including a gear engaging the gear on the intermediate shaft, a sleeve mounted on said intermediate shaft concentric therewith, gears on opposite ends of said sleeve, a second gear on said planet gear element meshing with one of the gears on said sleeve, a rotatable carrier, a gear mounted on said carrier and meshing with the other gear on said sleeve, means for preventing reverse rotation of said second carrier, an internally geared member meshing with the gear on said second carrier, means keying said last member to the driven shaft for sliding movement with respect thereto, means on the intermediate shaft engageable by said last member for locking together the intermediate and driven shafts, means for shifting said last member, said second carrier having teeth on its periphery, means connected to said shifting means to engage said teeth and immobilize said carrier, and clutching means operable to lock said sleeve to said first carrier or to immobilize the sleeve.

14. Variable speed transmission comprising a driving shaft, a planet gear carrier rigidly mounted on said driving shaft, a planet gear element mounted on said carrier, a driven shaft, an intermediate shaft between said driving and driven shafts, a gear on said intermediate shaft, said planet gear element including a gear engaging the gear on the intermediate shaft, a sleeve mounted on said intermediate shaft concentric therewith, gears on opposite ends of said sleeve, a second gear on said planet gear element meshing with one of the gears on said sleeve, a rotatable carrier, a gear mounted on said carrier and meshing with the other gear on said sleeve, means for preventing reverse rotation of said second carrier, an internally geared member meshing with the gear on said second carrier, means connecting said driven shaft and said intermediate shaft, a disc keyed on said sleeve, and selective clutching means to lock said sleeve to said first carrier, or to immobilize the sleeve.

15. Variable speed transmission comprising a driving shaft, a planet gear carrier rigidly mounted on said driving shaft, a planet gear element mounted on said carrier, a driven shaft, an intermediate shaft between said driving and driven shafts, a gear on said intermediate shaft, said planet gear element including a gear engaging the gear on the intermediate shaft, a sleeve mounted on said intermediate shaft concentric therewith, gears on opposite ends of said sleeve, a second gear on said planet gear element meshing with one of the gears on said sleeve, a rotatable carrier, a gear mounted on said carrier and meshing with the other gear on said sleeve, means for preventing reverse rotation of said second carrier, an internally geared member meshing with the gear on said second carrier, means connecting said last member to the driven shaft, for locking together the intermediate and driven shafts, a disc keyed on said sleeve and shiftable longitudinally with respect thereto, clutching elements carried by said disc, a movable clutching element carried by said first carrier and engageable with the clutching element on the disc to lock said sleeve to said first carrier, a second clutching element engageable with another clutching element on said disc, said last clutching element being substantially non-rotatable, whereby upon engagement with the clutching element of the disc the sleeve is immobilized, and selective means for shifting said clutching elements whereby said disc may be engaged by one or the other clutching elements or may remain free.

16. In a device as claimed in claim 15, said clutching elements being conical.

17. In a device as claimed in claim 15, said clutching elements including a pair of conical clutching elements carried by said carrier and a pair of substantially non-rotatable conical clutching elements, the clutching elements on the disc being conical and extending between the clutching elements of the pairs respectively.

18. In a device as claimed in claim 15, said substantially non-rotatable clutching element being mounted for a slight angular movement.

19. Variable speed transmission comprising a driving shaft, a planet gear carrier rigidly mounted on said driving shaft, a planet gear element mounted on said carrier, a driven shaft, an intermediate shaft between said driving and driven shafts, a gear on said intermediate shaft, said planet gear element including a gear engaging the gear on the intermediate shaft, a sleeve mounted on said intermediate shaft concentric therewith, gears on opposite ends of said sleeve, a second gear on said planet gear element meshing with one of the gears on said sleeve, a carrier rotatably mounted on the outside of said sleeve, a gear mounted on said carrier and meshing with the other gear on said sleeve, a one-way clutch arrangement for preventing reverse rotation of said second carrier, an internally geared member meshing with the gear on said second carrier, means keying said last member to the driven shaft for sliding movement with respect thereto, means on the intermediate shaft engageable by said last member for locking together the intermediate and driven shafts, manual means for shifting said last member, said second carrier having teeth on its periphery, means connected to said shifting means to engage said teeth and immobilize said carrier, a disc keyed on said sleeve and shiftable longitudinally with respect thereto, clutching elements carried by said disc, a movable clutching element carried by said first carrier and engageable with the clutching element on the disc to lock said sleeve to said first carrier, a second clutching element engageable with another clutching element on said disc, said last clutching element being substantially non-rotatable, whereby upon engagement with the clutching element of the disc the sleeve is immobilized, and selective means for shifting said clutching elements whereby said disc may be engaged by one or the other clutching elements or may remain free.

ALPHONSE FORICHON.